Nov. 18, 1924.
W. F. EVANS
LOCK WASHER
Filed Oct. 4, 1922
1,516,271
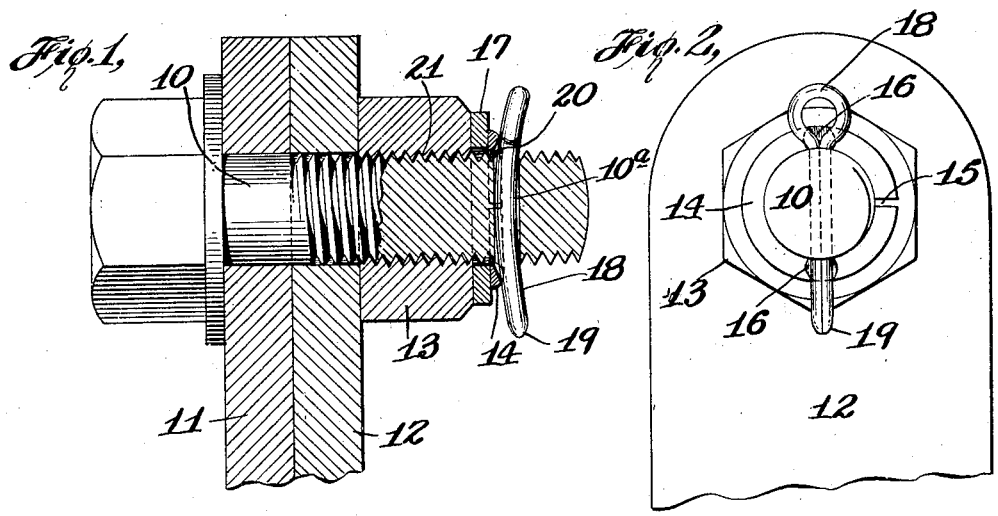
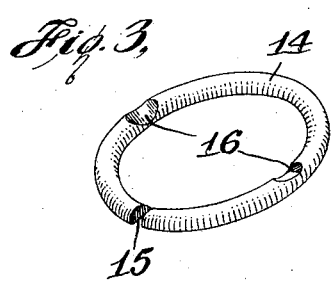
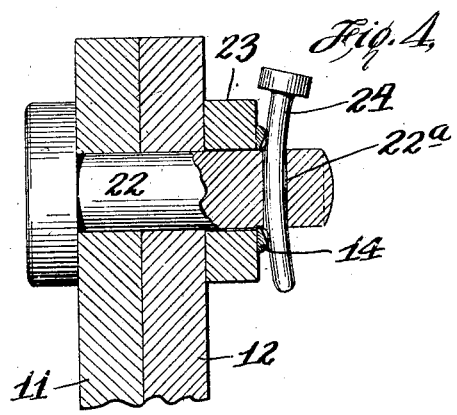
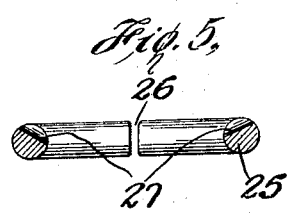
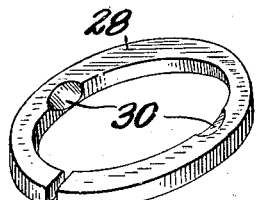
Inventor
William F. Evans
By his Attorneys
Edgar Tate & Co Patented Nov. 18, 1924.

1,516,271

UNITED STATES PATENT OFFICE.

WILLIAM F. EVANS, OF ASTORIA, NEW YORK, ASSIGNOR OF ONE-THIRD TO NICOLA FIGLIOLO, OF NEW YORK, N. Y.

LOCK WASHER.

Application filed October 4, 1922. Serial No. 592,272.

*To all whom it may concern:*

Be it known that I, WILLIAM F. EVANS, a citizen of the United States, and residing at Astoria, in the county of Queens and State of New York, have invented certain new and useful Improvements in Lock Washers, of which the following is a specification, such as will enable those skilled in the art to which it appertains to make and use the same.

This invention relates to lock washers and particularly to devices of this class designed to be used in connection with bolts, screws, pins and the like for permanently retaining nuts, washers and the like in predetermined position thereon in holding parts or elements mounted on said pins or bolts against displacement thereon; and the object of the invention is to provide a lock washer which is preferably split, and provided with one or more grooves or recesses in one face thereof, whereby a pin may be passed into or through an aperture provided in the bolt, screw or pin to wedge and securely hold a nut, collar, washer or the like on a bolt or pin; a further object being to provide a lock washer of the class and for the purpose specified, which will operate to lock a nut on a bolt, screw, or other threaded member against movement in any direction thereon; and with these and other objects in view, the invention consists in a device of the class and for the purpose specified, which in combination with a plain or threaded member will operate to retain predetermined parts or elements thereon against displacement as hereinafter described and claimed.

The invention is fully disclosed in the following specification of which the accompanying drawing forms a part, in which the separate parts of my improvement are designated by suitable reference characters in each of the views, and in which:—

Fig. 1 is a partial sectional view illustrating one method of carrying my invention into effect.

Fig. 2 is a face view of the construction shown in Fig. 1.

Fig. 3 is a detail perspective view of the lock washer shown in Figs. 1 and 2.

Fig. 4 is a view similar to Fig. 1 showing another method of carrying my invention into effect.

Fig. 5 is a sectional view of a modified form of lock washer which I may employ.

Fig. 6 a perspective view of another form of lock washer which I may employ; and, Fig. 7 is a sectional view of another modified form of lock washer.

In Figs. 1 and 2 of the drawing, I have shown at 10 a bolt on which is mounted two plates or elements 11 and 12 to be retained on said bolt by a nut 13 and in carrying my invention into effect, I provide a lock washer 14 shown in detail in Fig. 3 of the drawing, and which is preferably split as shown at 15, and in the construction shown in said figures, is composed of a strip of material which is semi-spherical in form in cross section and provided on the convex face thereof and on opposite sides thereof with recesses 16.

The bolt 10 is provided adjacent to the end portion thereof with a transverse aperture $10^a$ and in practise, and after the nut 13 has been moved into proper position to retain the plates or elements 11 and 12 thereon, I mount on the shank of the bolt 10, one of my improved lock washers 14. In the event that the washer 14 is not properly positioned on the bolt with reference to the aperture $10^a$, one or more plain washers or rings 17 are first employed and one of which is shown in Fig. 1 of the drawing, and when the washer is properly positioned with reference to the aperture $10^a$, a pin 18 such for example as a cotter-pin or the like and preferably pointed at its end as shown at 19, is passed into the aperture $10^a$ where one of the recesses 16 of the lock washer 14 is located, and is driven through the aperture $10^a$ to extend outwardly therethrough, in which operation it passes over the opposite recess 16 in the lock washer 14.

In the operation of driving the pin 18 in position, that part of the lock washer in which the first named recess is located, will be forced into one of the recesses formed by the threads of the bolt 10 as shown at 20 in Fig. 1 of the drawing, and the threads of the nut will be forced or jammed against the threads of the bolt as diagrammatically illustrated at 21 in Fig. 1 of the drawing, and the nut 13 will be locked and retained against movement in either direction on the bolt 10.

With this construction, it will be apparent that any strain of the plates or elements 11 and 12 mounted on the bolt, will be taken up by the nut 13 thereon as well as the head of the bolt and also partially by the lock washer 14 and not by the pin 18. It will also be understood that by locking the nut 13 on the bolt 10 in the manner described, said nut may be locked in any desired position without pressure on the plates or elements 11 and 12 to permit of the rotatable movement of said plates or elements thereon. It will also be apparent that whenever desired, the bolt 10 may be removed from the plates 11 and 12 by first removing the pin 18 and lock washer 14 and washer 17, if such be employed, and a wrench be applied to the nut 13 in the usual manner. By providing a split washer, it will be apparent that the separate side portions of the washer will have more or less spring properties, thus facilitating the proper functioning of the washer in the manner above set out.

In Fig. 4 of the drawing, I have shown another use of my invention, in which the bolts or elements 11 and 12 are mounted on a plain, headed pin 22 provided with a transverse aperture 22ª adjacent to its free end and the washer 14 is employed as well as a plain washer or spacer 23, and a plain headed and pointed pin 24 is used instead of a cotter-pin as shown in Figs. 1 and 2 of the drawing. With this construction, it will be understood that the bolts or elements 11 and 12 will be securely held and retained in position on the pin 22 by friction.

In Fig. 5 of the drawing, I have shown a slight modification of the lock washer 14 shown in Figs. 1 to 4 inclusive, in which I employ a washer 25 composed of rod-like material or material which is cylindrical in form in cross section and split as shown at 26, and provided at opposite sides and on one face of the washer with recesses 27. In Fig. 6 of the drawing, I have shown a flat washer 28 split as shown at 29 and provided with oppositely disposed recesses 30 on one face thereof.

In Fig. 7 of the drawing, I have shown a lock washer 31, substantially of the same general form as the washer 14 but which is composed of sheet metal, semi-circular in cross section and fashioned to form a corrugated lock washer to give strength and rigidity thereto, and also to form spaced recesses 32, which may function as the recesses 16, 27 and 30 of the other lock washers employed.

My improved lock washers are all preferably composed of strong and durable material and are also preferably hardened to give the greatest possible strength and durability thereto, and while I have shown the same as being composed of strip material and split, I am not necessarily limited in this respect, nor am I limited to the specific method of using the lock washers as herein shown and described, the broad idea of my invention being to provide a pin, rod, bolt or the like with one or more transverse apertures and a lock washer provided with one or more recesses, whereby a pointed member or pin may be passed through the bolt, pin, rod or the like and through the recesses in said lock washer for retaining predetermined elements on said pin, bolt or the like, and various changes in and modifications of the construction herein shown and described may be made within the scope of the appended claims without departing from the spirit of my invention, or sacrificing its advantages.

Having fully described my invention, what I claim as new and desire to secure by Letters Patent, is:—

1. A split lock washer of the class described, provided in one side face thereof with one or more recesses beveled inwardly and radially.

2. The herein described means for retaining one or more parts on a pin, bolt or the like, which consists in providing one end portion of said pin or bolt with an aperture, a lock washer mounted on said pin or bolt in juxtaposition to the aperture thereof, and partially covering said aperture, the outer face of said washer being provided with oppositely disposed recesses beveled inwardly and radially, and means whereby a pointed member may be passed into the aperture of said pin or bolt and cooperating with said lock washer to retain said part or parts on said pin or bolt.

3. The herein described means for retaining one or more parts on a pin, bolt or the like, which consists in providing one end portion of said pin or bolt with an aperture, a lock washer mounted on said pin or bolt in juxtaposition to the aperture thereof, and partially covering said aperture, the outer face of said washer being provided with oppositely disposed recesses beveled inwardly and radially, means whereby a pointed member may be passed into the aperture of said pin or bolt and cooperate with said lock washer to retain said part or parts on said pin or bolt, and spacing means for properly positioning said washer on said pin or bolt.

4. The combination with a bolt provided with a transverse aperture of means for retaining a nut in predetermined position on said bolt, comprising a lock washer adapted to be positioned on said bolt in justaposition to the aperture thereof, and means passed through the aperture of said bolt and cooperating with said washer for moving said washer in position to retain said nut against movement in either direction on said bolt, a predetermined portion of said washer being adapted to engage the threads of said bolt.

5. The combination with a bolt provided with a transverse aperture of means for retaining a nut in predetermined position on said bolt, comprising a split lock washer adapted to be positioned on said bolt in juxtaposition to the aperture thereof, and provided with one or more recesses in the outer face thereof, and means passed through the aperture of said bolt and through the recess of said lock washer to move said washer longitudinally of the bolt to retain said nut in predetermined position thereon.

6. The combination with a bolt provided with a transverse aperture of means for retaining a nut in predetermined position on said bolt, comprising a split lock washer adapted to be positioned on said bolt in juxtaposition to the aperture thereof, and provided with one or more recesses in the outer face thereof, means passed through the aperture of said bolt and through the recess of said lock washer to move said washer longitudinally of the bolt to retain said nut in predetermined position thereon, and a spacing member or members for properly positioning said lock washer on said bolt.

7. The combination with a bolt provided with a transverse aperture of means for retaining a nut in predetermined position on said bolt, comprising a split lock washer adapted to be positioned on said bolt in juxtaposition to the aperture thereof, and provided with one or more recesses in the outer face thereof, means passed through the aperture of said bolt and through the recess of said lock washer to move said washer longitudinally of the bolt to retain said nut in predetermined position thereon, and a spacing member or members for properly positioning said lock washer on said bolt, and a predetermined portion of said lock washer being adapted to be moved into engagement with the threads of said bolt in securing said nut in position.

8. A split lock washer of the class described provided in one side face thereof with oppositely disposed recesses arranged at an angle to the longitudinal plane of the washer and beveled inwardly.

9. A lock washer of the class described provided on one side face thereof with oppositely disposed recesses beveled inwardly toward the axis of said washer.

In testimony that I claim the foregoing as my invention I have signed my name this 2nd day of October 1922.

WILLIAM F. EVANS.